3,077,507
FUEL CELL ELECTRODE
Karl V. Kordesch, Lakewood, and Elmer M. King, Berea, Ohio, assignors to Union Carbide Corporation, a corporation of New York
No Drawing. Filed May 16, 1960, Ser. No. 29,176
13 Claims. (Cl. 136—86)

This invention relates to fuel cells of the type wherein a fuel is oxidized to directly produce electricity. It more specifically refers to inert conductive electrodes which are particularly adapted for use in fuel cells of this type.

It is an object of this invention to provide electrodes for use in such fuel cells which increase the output efficiency thereof many fold.

Fuel cells, as the term is used herein, take advantage of the direct oxidation of a fuel, as for example hydrogen, carbon monoxide, or alcohols, by an oxidizing agent, such as air or oxygen. This reaction is carried out preferably with an alkaline electrolyte to directly produce electric power. It has been found that inert conductive electrodes made from carbon or sintered nickel, for example, are extremely efficient in supporting the oxidation and conducting away the thus-produced electricity. It was found early in fuel cell work that carbon electrodes could be made more efficient by subjecting the surface thereof to a mild oxidant such as carbon dioxide or steam to thereby increase surface porosity. A heavy metal spinel catalyst was then applied to this surface according to the teaching of U.S. Patents 2,615,932 and 2,669,598, Marko et al. Such electrodes are fully disclosed in U.S. application Serial No. 764,342, filed September 30, 1958, Kordesch et al. This treatment resulted in a tenfold increase in efficiency over untreated electrodes of the same size.

This improvement is remarkable in itself; however, it is now possible by the practice of this invention to increase tenfold the productivity of a fuel cell of the type described, over the improvement of U.S. Serial No. 764,342, filed September 30, 1958, Kordesch et al. The description herein will utilize the hydrogen/oxygen/potassium hydroxide fuel cell having carbon electrodes as exemplary throughout in order to simplify discussion. It will be understood, however, that the electrodes described herein may be applied to other fuel cell systems of the same general type such as for example those which use other fuels than hydrogen or other oxidants than oxygen. Also the electrolyte may be varied as may the electrode base material which will be discussed below.

It is known that carbon may be deposited by the catalytic disproportionation of a gaseous carbonaceous atmosphere such as carbon monoxide, methane, acetylene, and carbon monoxide-hydrogen mixtures. It has been found according to the present invention that when such deposition is accomplished on an insert, conductive fuel cell electrode and the resulting article is incorporated in a fuel cell, an amazing improvement in performance is obtained. This improvement consists of an increased cell output of 100-fold over an electrode not having a deposit of this particular carbon and without other special treatments and 10-fold over an electrode made according to the above-noted Marko et al. patents and U.S. Serial No. 764,342, filed September 30, 1958, Kordesch et al. For simplicity of discussion, this deposited carbon layer will be hereinafter referred to as highly active carbon and may be defined as the product of catalytic disproportionation of gaseous carbonaceous atmospheres.

An article in conformity with this invention comprises a relatively porous, inert, conductive substrate, preferably carbon, or a sintered metal which has at least some graphite on its surface or intermingled therewith; and which has a continuous deposit of highly active carbon on the surface thereof.

The degree of porosity of the substrate is well defined in the art and particularly in U.S. application Serial No. 764,342, filed September 30, 1958, Kordesch et al., wherein the basic requirements of an efficient fuel cell are set forth. Generally, the preferred porosity is such that 20 to 40 cubic centimeters of gas will pass through the walls of a tube ½ inch inside diameter and 1 inch long with ⅛ inch thick walls in one minute when a differential pressure of 40 mm. Hg is applied across the walls or 50 to 60% as determined by water porosity measurement. The substrate must be conductive in order to be able to draw off the power produced by the oxidation of the fuel. To this end it is convenient to use metals such as porous nickel or porous stainless steel which have been coated with colloidal graphite. It is preferred, however, to provide the whole substrate of carbon. It has been found that non-graphitic carbon should be baked to a high temperature, suitably 2000° C., or coated with graphite similarly to the metals referred to above.

The process of depositing a layer of highly active carbon on an inert porous conductive substrate may be exemplified by the disproportionation of carbon monoxide using a metal catalyst. Accordingly, a substrate of the desired porosity and composition is treated with an aqueous salt of a metal catalyst. Suitably this may be ferric nitrate, cobalt nitrate, nickel nitrate, ammonium vanadate in nitric acid, iron formate, iron oxalate, nickel formate, nickel oxalate, or mixtures thereof. The thus treated substrate is heated to a temperature between 500° C. and 800° C. in the presence of an appropriate gaseous carbonaceous atmosphere, preferably carbon monoxide or carbon monoxide mixed with hydrogen, for about one to four hours. This produces a continuous coating of highly active carbon on the surface of the substrate. It has been found that the metal salt should not be allowed to penetrate too deeply into the porous substrate since this may result in disruption of the substrate upon heating. In order to insure only surface treatment with the metal catalyst, it has been found expedient to use a precipitating agent, such as for example ammonium hydroxide, or a gelling agent, such as carboxymethyl cellulose, on the substrate surface. These materials tend to prevent penetration of the disproportionation catalyst into the porous substrate. The amount of carbon deposition from the carbon containing atmosphere is a function of the atmosphere composition, the heating time, the heating temperature and the amount and kind of catalyst employed. These variables may be adjusted to give substantially any amount of carbon desired. It has been found that a coating from 0.01 mm. to 0.10 mm. thick works well and is preferred in the practice of this invention. With carbon monoxide or carbon monoxide mixed with hydrogen atmosphere, the preferred deposition temperature is 600° C. to 700° C. with a heating period of one to one and one-half hours being preferred.

Where it is desired to improve the conductivity of the substrate and the finished article, an aqueous solution of silver nitrate may be used in conjunction with the catalyst metal salts previously provided on the substrate surface. When a substrate having this mixed salt is subjected to the same conditions as outlined above, a thin layer of metallic silver is formed which enhances the conductivity of the article. For example a substrate tube 1 inch long having an inside diameter of ½ inch and an outside diameter of ¾ inch had a resistance of 20 milliohms after active carbon deposition according to this invention using an iron catalyst. When a 20% aqueous silver nitrate solution was used at a concentration of 3 milliliters per square inch of electrode surface area in addition to the iron, the resulting resistance was lowered to 5 milliohms.

Articles which have been made according to this invention are extremely well suited to use as fuel cell electrodes, either for the oxidation or the reduction reaction which occur in such cells. It is necessary to provide a platinum group metal catalyst on the hydrogen fuel electrode, however, and this may be accomplished by any technique available directly over the deposited active carbon layer. If desired, a wetproofing treatment may be used over the active carbon layer. This latter step has been found to be unnecessary since the carbon coating is sufficiently finely porous to retard the penetration of liquid into the porous substrate. This penetration may be referred to as drowning and results in articles which are useless for fuel cell operation unless revived in some way. Fuel cell electrodes made according to this invention which have not been wetproofed to any extent, except by the application of the active carbon coating, have been totally immersed in electrolyte and have functioned properly upon removal therefrom with substantially no revival treatment. Thus a porous substrate-highly active carbon coated article according to this invention may be used directly as the electrode for the oxidizing agent in a fuel cell without further treatment. It is possible, though not at all necessary, to provide spinel catalysts, such as those described in U.S. Patents 2,615,932 and 2,669,598 Marko et al., and U.S. application Serial Number 764,342 Kordesch et al., filed September 30, 1958, on this electrode without departing from this invention.

Specifically, a porous graphite tube 3 inches long having a ½ inch inside diameter and a ¾ inch outside diameter was treated with 3 milliliters of a 2 molar aqueous solution of ferric nitrate and dried at 120° C. for about ½ hour. The tube was then heated to 600° C. under a nitrogen atmosphere. The nitrogen was replaced with carbon monoxide having a small amount of hydrogen therein and flowing around the tube at a rate of about 1 liter per minute. After 2 hours at 600 C. under the carbon monoxide atmosphere, the atmosphere was replaced with nitrogen and the article allowed to cool. The article was found to have a uniform, finely porous, gas permeable carbon coating 0.1 mm. thick thereon. It was brushed clean of loose particles and dust and incorporated as the oxidizing agent electrode in a fuel cell.

Articles made according to this invention have been used extensively as electrodes for the oxidizing agent in fuel cells. Table I below is a compilation of data taken from operating such an electrode against a zinc electrode in a 40 to 50 percent potassium hydroxide electrolyte. These data should be compared with operating data for oxidizing agent electrodes made by the best prior techniques. These data on prior art electrodes include densities ranging from 50 milliampers per square centimeter at 1.2 volts operating at 20° C. with air as the oxidizing agent to about 200 milliamperes per square centimeter at 1.1 volts operating at 100° C. with oxygen as the oxidizing agent.

Table I

| Potential (volts) | Temperature (° C.) | Current Density (ma./cm.²) | Oxidizing Agent |
|---|---|---|---|
| 1.20 | 20 | 100 | Air. |
| 1.05 | 20 | 200 | Do. |
| 1.25 | 80 | 100 | Do. |
| 1.15 | 80 | 200 | Do. |
| 1.33 | 20 | 100 | Oxygen. |
| 1.30 | 20 | 200 | Do. |
| 1.24 | 20 | 500 | Do. |
| 1.18 | 20 | 1,000 | Do. |
| 1.35 | 80 | 100 | Do. |
| 1.31 | 80 | 500 | Do. |
| 1.28 | 80 | 1,000 | Do. |
| 1.20 | 80 | 2,000 | Do. |
| 1.26 | 100 | 2,000 | Do. |
| 1.15 | 100 | 4,000 | Do. |

Consideration of these data show a remarkable increase in cell productivity where an electrode has been prepared according to this invention. The productivity has been found to be increased as much as 10 times where an active carbon layer has been coated on a porous substrate to provide a fuel cell electrode.

Additional tests have been run on articles prepared according to this invention which have been used as fuel cell electrodes. In these tests, one group of articles was made according to this invention. These were employed as the oxidizing agent electrode in a fuel cell. Another group of articles to be used as fuel electrodes was made according to this invention and then modified by applying platinum group metal catalysts to the surface thereof. A third group of articles to be used as fuel electrodes was made according to prior art techniques and platinum group metal catalysts were applied to the surfaces thereof. In these later two cases, the platinum group metal catalysts were identical. A fourth group of articles to be employed as oxidizing agent electrodes were made up according to prior art techniques. Two groups of fuel cells were set up; one group had oxidizing agent and fuel electrodes made according to the prior art, and the rest of the cells were equipped with fuel electrodes and oxidizing agent electrodes made according to this invention. Each cell had a potassium hydroxide electrolye, oxygen as the oxidizing agent, and hydrogen as the fuel. Table II is a compilation of data taken from the operation of these cells at 80° C. to 100° C. under identical throughput rates of hydrogen and oxygen. Each of the cells was exactly the same.

Table II

| Voltage output (volts) | current density (ma./cm.²) | |
|---|---|---|
| | with active carbon deposit | without active carbon deposit |
| 0.89 | 100 | 25 |
| 0.85 | 200 | 50 |
| 0.76 | 500 | 100 |
| 0.68 | 1,000 | 200 |

A consideration of the data presented in this table shows conclusively that under identical conditions of operation, fuel cell electrodes made according to this invention are at least 4 times more productive of useful power output than were the best electrodes produced prior to the subject invention.

What is claimed is:

1. A fuel cell adapted to directly convert the reaction of an oxidizing agent and an oxidizable fuel to electricity which comprises at least two electrodes and an electrolyte therebetween, at least one of said electrodes comprising an inert, porous, conductive substrate and on said substrate a uniformly thin continuous coating of gas permeable highly active carbon consisting of the disproportionation product of a gaseous carbonaceous atmosphere in the presence of a metal catalyst.

2. A fuel cell as described in claim 1 wherein said substrate is substantially all carbon.

3. A fuel cell as described in claim 1 wherein said substrate is porous metal containing a small amount of graphite.

4. A fuel cell as described in claim 1 wherein said substrate has a thin layer of silver thereon.

5. A fuel cell as described in claim 1 wherein said coating is from 0.01 mm. to 0.1 mm. thick.

6. A fuel cell as described in claim 1 wherein said catalyst is selected from the group consisting of iron, nickel, cobalt and vanadium catalysts.

7. A fuel cell as described in claim 1 wherein a heavy metal spinel catalyst is applied over said active carbon.

8. A fuel cell as described in claim 1 wherein at least one platinum group metal is applied over said active carbon.

9. A fuel cell as described in claim 1 wherein a heavy metal spinel catalyst and at least one platinum group metal is applied over said active carbon.

10. A fuel cell adapted to directly convert the reaction of an oxidizing agent and an oxidizable fuel to electricity which comprises at least two improved electrodes and an aqueous alkaline electrolyte therebetween, said electrodes each comprising a porous, inert, conductive substrate and on said substrate a uniformly thin continuous coating of gas permeable highly active carbon consisting of the disproportionation product of a gaseous carbonaceous atmosphere in the presence of a metal catalyst; said electrode which is adapted to utilize said oxidizable fuel being modified by the application of at least one platinum group metal thereon.

11. A fuel cell as described in claim 10 wherein said electrolyte is potassium hydroxide and wherein said electrodes are each tubular in shape and spaced equidistant from each other.

12. A fuel cell as described in claim 10 wherein said electrode which is adapted to utilize said oxidizing agent is modified by the application of a heavy metal spinel catalyst thereon.

13. A fuel cell as described in claim 10 wherein each electrode has a deposit of silver and deposits of highly active carbon therein.

References Cited in the file of this patent

UNITED STATES PATENTS

| | | |
|---|---|---|
| 913,390 | Jungner | Feb. 23, 1909 |
| 1,470,300 | Szarvasy | Oct. 9, 1923 |
| 1,678,405 | Oppenheim | July 24, 1928 |
| 1,849,675 | Kramer | Mar. 15, 1932 |
| 1,894,126 | Schmidt | Jan. 10, 1933 |
| 2,000,815 | Berl | May 7, 1935 |
| 2,154,312 | MacCallum | Apr. 11, 1939 |
| 2,358,359 | Stuart | Sept. 19, 1944 |
| 2,615,932 | Marko et al. | Oct. 28, 1952 |
| 2,669,598 | Marko et al. | Feb. 16, 1954 |

FOREIGN PATENTS

| | | |
|---|---|---|
| 199,736 | Great Britain | June 22, 1923 |
| 521,773 | Great Britain | May 30, 1940 |

UNITED STATES PATENT OFFICE

CERTIFICATE OF CORRECTION

Patent No. 3,077,507                   February 12, 1963

Karl V. Kordesch et al.

It is hereby certified that error appears in the above numbered patent requiring correction and that the said Letters Patent should read as corrected below.

Column 1, line 55, for "insert" read -- inert --; column 4, line 31, after "same" insert -- size --.

Signed and sealed this 24th day of September 1963.

(SEAL)
Attest:

ERNEST W. SWIDER
Attesting Officer

DAVID L. LADD
Commissioner of Patents